Nov. 10, 1964  E. G. LUNDGREN  3,156,031

TOOL HOLDER

Filed Sept. 7, 1961  4 Sheets-Sheet 1

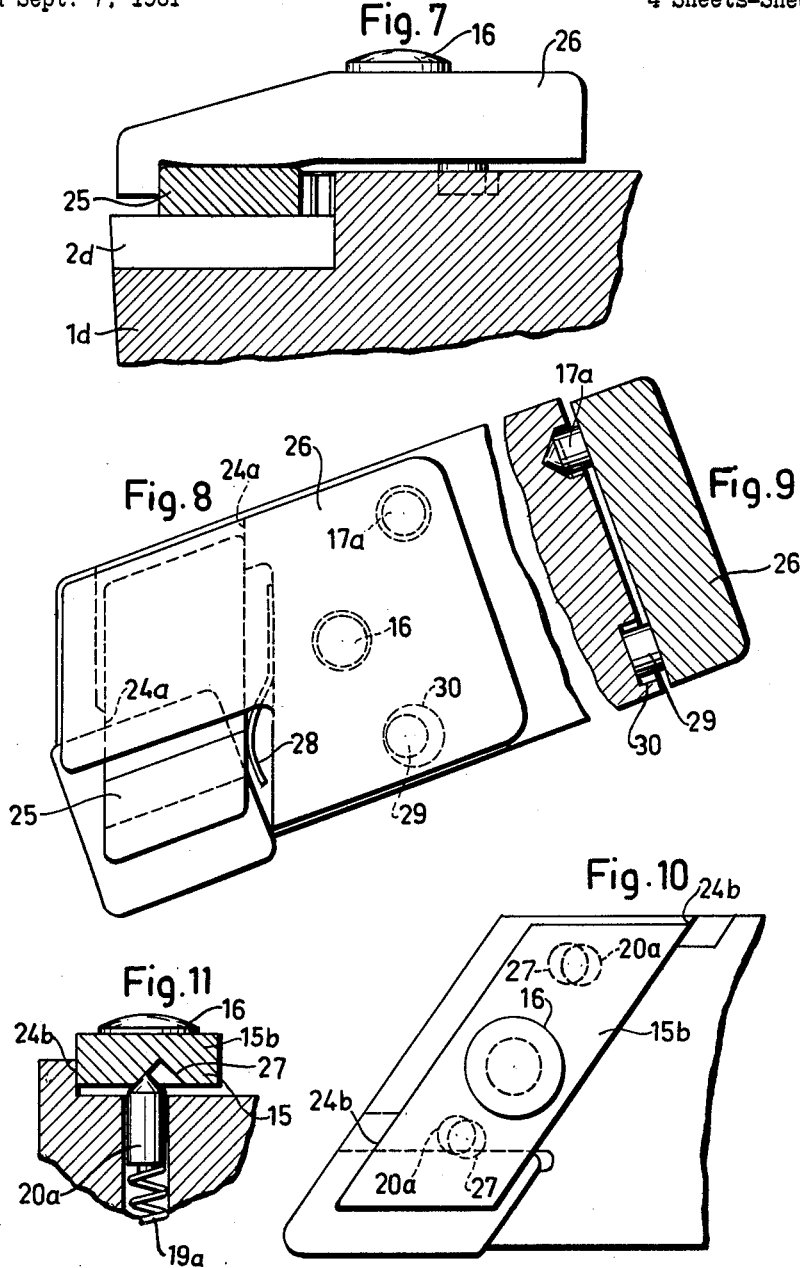

Nov. 10, 1964  E. G. LUNDGREN  3,156,031
TOOL HOLDER
Filed Sept. 7, 1961  4 Sheets-Sheet 3
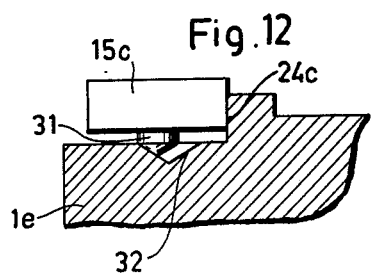
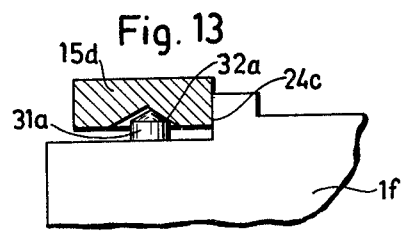
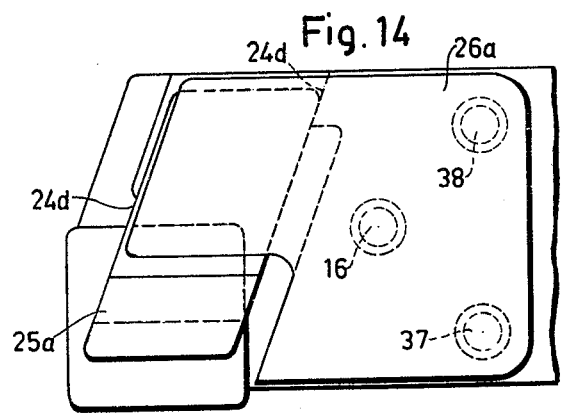
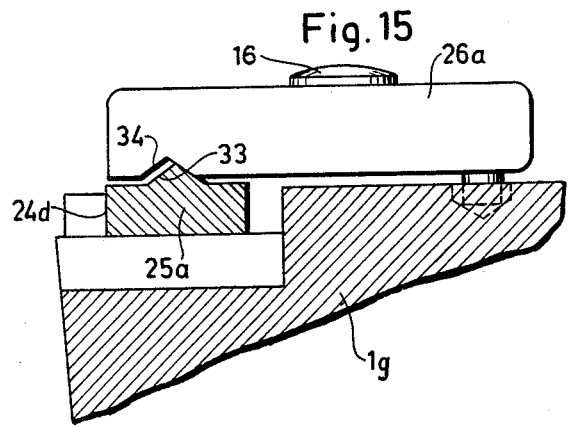
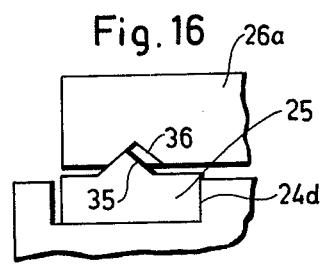

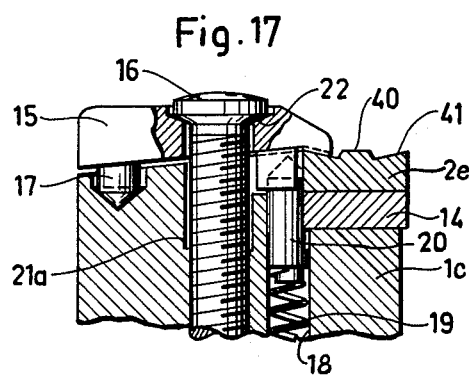
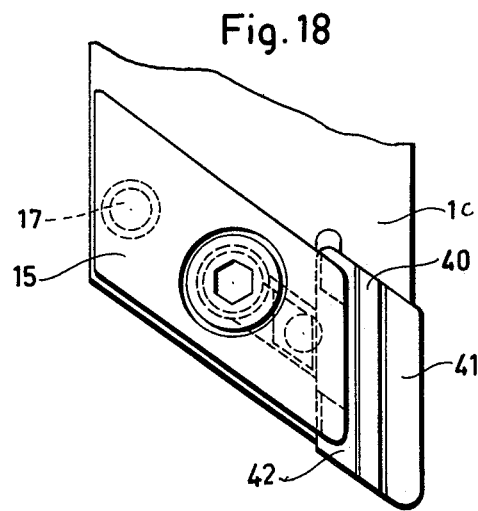

United States Patent Office 3,156,031
Patented Nov. 10, 1964

3,156,031
TOOL HOLDER
Evert Gustav Lundgren, Sandviken, Sweden, assignor to Sandvikens Jernverks Aktiebolag, Sandviken, Sweden, a corporation of Sweden
Filed Sept. 7, 1961, Ser. No. 136,523
Claims priority, application Sweden, Sept. 10, 1960, 8681/60
2 Claims. (Cl. 29—96)

The present invention relates to a tool holder comprising a holder shank and clamping means for clamping a cutting insert against a supporting surface of the shank, with or without a separate chip breaker between the clamping device and the insert.

In tool holders of this kind it has appeared that the force exerted by the work piece on the clamped insert may under certain working conditions have a component along the supporting surface of such a magnitude that the insert is moved along the supporting surface because the friction force between the insert and the said surface is not great enough to keep the insert in its original position. This means of course that the working accuracy decreases when such a force occurs which very much complicates the achieving of an even worked surface. The accuracy in for instance copy turning will also be bad.

Figure 4:
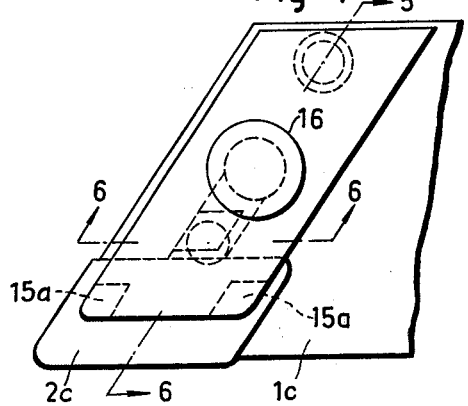
Figure 5:
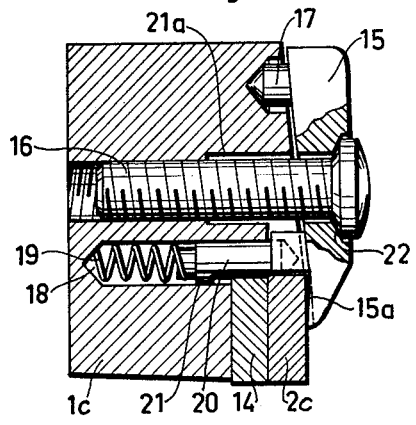
Figure 6:
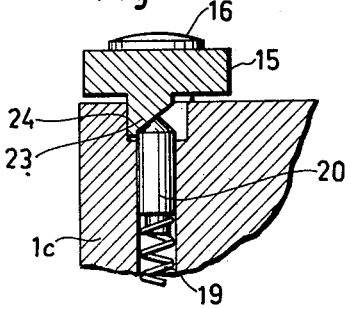

In order to remedy this deficiency in hitherto known tool holders I propose to support the clamping jaw of the clamping device against movement sidewards so that the friction between the jaw and the insert contributes to counteracting of the force against the insert which is parallel to the supporting surface. The invention is characterized in that the tool holder also comprises special, suitably resilient means which, in the clamping of the insert, presses a surface of the clamping device against a stop on the holder shank or a surface of the chip breaker against a stop either on the holder shank or on the clamping device whereby the clamping device or the chip breaker in clamped position is safely locked against movement in the direction against the said stop surface. The invention will be described with aid of the attached drawings in which FIGURES 1–3 are diagrammatic elevational views which show the function of the device, FIGURES 4–6 show one embodiment of the invention, FIGURES 7–9 show another embodiment of the invention, FIGURES 10 and 11 show a third embodiment of the invention, FIGURES 12 and 13 show different details, FIGURES 14–16 show a fourth embodiment of the invention, and FIGURES 17 and 18 show the embodiment of FIGURES 4–6 but with another shape of the insert.

Figure 1:
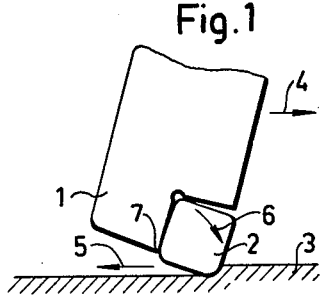
Figure 2:
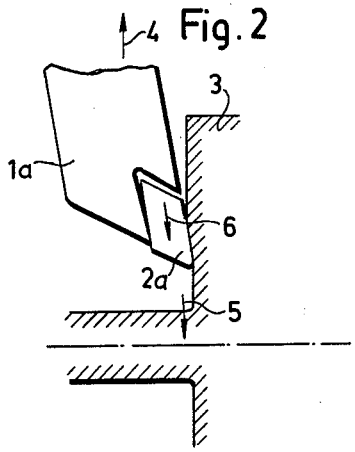

Referring to the drawings, FIGURE 1 shows a tool holder 1 with a cutting insert 2 which is held to the holder by a clamping device which is not shown. The work piece 3 is worked over by the insert which is moved in the feeding direction indicated by the arrow 4. As appears from FIGURE 1 the working depth is very small in comparison with the extension of the cutting insert. For this small working depth the component indicated by the arrow 5 of the force against the insert will be directed outside the holder corner 7 and tends to turn the insert in the direction indicated by the arrow 6 with the corner 7 as a fulcrum. In FIGURE 2 is shown another embodiment in which the force against the insert 2a directed along the supporting surface tends to move the insert in the direction from the insert site along the supporting surface. The parallelogram shaped insert 2a, which is clamped in the tool holder 1a, works on the work piece 3 and is moved in the feeding direction indicated by the arrow 4. The force indicated by the arrow 5 pressing against the insert tends to pull the insert in the direction of the arrow 6 out from the insert site.

Figure 3:
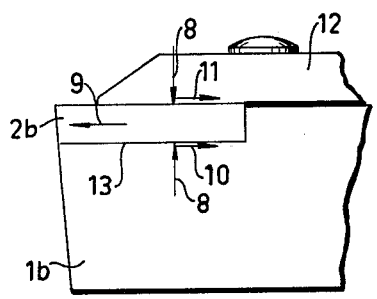

FIGURE 3 shows the forces acting upon the insert. In the tool holder 1b an insert 2b is clamped between a clamping jaw 12 and a supporting surface 13. Against the insert acts the clamping force indicated by the arrows 8, 8. If a horizontal force indicated by the arrow 9 acts against the insert in the direction away from the site of the insert, this force is counteracted by the friction force indicated by the arrow 10 between the supporting surface 13 and the lower surface of the insert. A corresponding friction force between the insert and the clamping jaw will not occur in case there is play between the clamping jaw and the tool holder, and if the friction between the clamping jaw and the tool holder is small the insert will move in the direction of the force indicated by the arrow 9 when this force exceeds the friction component 10. Only when the play between the clamping jaw 12 and the holder 1b is eliminated will the friction force indicated by the arrow 11 arise.

For tool holders in which there is a risk that the forces against the cutting insert will tend to press or pull the insert from its site it is necessary in order to prevent this movement to eliminate all play between the clamping jaw and the tool holder shaft during the tightening of the clamping device against the insert. In this way both the lower and the upper friction forces can be used to counteract the horizontal force against the insert. This is performed by exerting a sideward pressure on the clamping jaw so that it presses sidewards against the tool holder shank during the tightening and also after the tightening. The pressure can be achieved by a spring or by inclined contact surfaces pressing the clamping jaw sidewards under the influence of the clamping force. In the following are shown a few examples of possible ways to eliminate the play between the clamping jaw and the tool holder shank.

In FIGURE 4 is shown a part of a tool holder seen from above, FIGURE 5 shows a section along the line 5—5 in FIGURE 4, and FIGURE 6 is a section along the line 6—6 in FIGURE 4. In the tool holder 1c a cutting insert 2c is placed between a supporting shim plate 14 and a clamping jaw 15. The end of the jaw, which is close to the insert, may be shaped as a chip breaker. The jaw is held by a tightening screw 16, running in threads in the shank 1c. The end of the clamping jaw 15, which is remote from the insert, is positioned with respect to the holder 1c by a pointed stud 17, which rests in a likewise pointed recess in the holder. When the clamping screw 16 is tightened, this device will determine the sideward postion of the axis of the stud 17. Between the clamping screw and the insert is a bore 18 in the tool holder shank, in which there is placed a pin 20, which is movable along and protruding from the bore, and which is pressed by a spring 19 towards the open end of the bore. The pin 20 can conveniently be provided with a lug 21, which can be stopped by the underside of the shim plate 14. As the shim plate usually is fastened by aid of screws or the like (not shown) there is thus formed a locking for the pin 20, so that it can not be pressed out from the bore 18. On the clamping jaw 15 there is a lug 23, against which the pin 20 is pressed by the spring 19. The contact surface between the pin 20 and the lug 23 is inclined whereby the lug tends to move sidewardly and the clamping jaw tends to turn around the stud 17. The lug 23 is situated adjacent to the side stop surface 24 on the tool holder 1c and will, under the influence of the spring be pressed against this side stop surface. The contact surface of the clamping jaw 15 with the insert 2c can suitably consist of downward projections 15a, 15a on the jaw as indicated in FIG- URE 4. In this way a stable tripod support is achieved for the clamping jaw, which rests upon the stud 17 and the projections 15a, 15a, and the insert is held firmly at both ends by the projections 15a, 15a. In this way is avoided the possibility of an unstable one-point contact between the jaw and the insert which may arise if the jaw has only one contact surface and this surface or the corresponding insert surface should happen to be slightly convex.

The sideward guiding of the clamping jaw 15 by aid of the stud 17 and the lug 23 is sufficient to fix the sideward position of the clamping jaw. In order to avoid having the clamping screw 16 exert any sideward force upon the clamping jaw, whereby possibly the lug 23 could be moved away from the contact with the stop 24, the bore for the clamping screw can be provided with threads only at its lower part and the upper part be made with a slightly greater diameter than the screw, leaving a clearance as is shown at 21a. By this arrangement the sideward movability of the screw will be greater, so that no appreciable sideward force can be exerted by the screw on the clamping jaw. In order to secure a good contact between the screw and the jaw in case of small sideward movements of the head of the screw, it is suitable to make the contact surface between the head of the screw and the clamping jaw spherical as shown at 22.

The construction described above has also the advantage that the spring 19 has a lifting effect upon the jaw 15 whereby the latter automatically is lifted upwardly when the clamping screw is loosened. In this way the changing of the insert 2c is facilitated.

It is also possible to omit the pivot bearing formed by the stud 17 and instead to make the screw with a thorough fit sidewardly in relation to the holder shank and the clamping jaw, or to place a bushing around the screw, whereby a pivot bearing is formed, which is concentric with the screw.

In FIGURES 7–9 is shown an embodiment of the tool holder 1d in which a separate chip breaker 25 is pressed against the upper surface of the insert 2d by a clamping jaw 26. The chip breaker 25 rests sidewardly aganist two side support surfaces 24a, 24a in the clamping jaw. A spring 28 fastened in the tool holder body presses the chip breaker into contact with the surfaces 24a, 24a. The clamping jaw 26 is supported in the holder shank by a pointed stud 17a or some other suitable pivoting device. A suitably round stud 29 projects from the clamping jaw downwardly into a bore 30 which has a greater diameter than the stud. Under the influence of the spring 28 the clamping jaw 26 will turn together with the chip breaker 25 till the stud 29 rests against the side of the bore 30. The side support surface 24a, 24a can also be situated in the tool holder body instead of in the clamping jaw.

In FIGURE 10 is shown a third embodiment of the invention. The clamping jaw 15b rests sidewardly against stops 24b, 24b, one at each end of the jaw. The stops 24b, 24b are situated at opposite edges of the jaw. The clamping screw 16 presses against the clamping jaw 15b. The sidewardly pressing force is, at least at the end situated close to the insert site, achieved by aid of a device shown in FIGURE 11. A pin 20a, which is influenced by a spring 19a, is pressed against an inclined contact surface of the bore 27, whereby the jaw 15b is pressed against one of the stop or side guiding surfaces 24b, 24b. The sideward force at the other end of the jaw can of course be achieved in the same way, but here another device is possible, which is shown in FIGURES 12 and 13. A stud 31 on the jaw 15c rests according to FIGURE 12 with an inclined contact surface on an inclined surface of a recess 32 in the tool holder. Under the influence of the clamping force the stud will be pressed sidewardly by the inclined contact surfaces, so that the jaw 15c is pressed against the stop 24c. A stud 31a can also be situated on the tool holder body and a bore 32a in the jaw 15d as shown in FIGURE 13. In these FIGURES 12 and 13 the tool holder is designated as 1e and 1f respectively.

In FIGURES 14–16 is shown a fourth embodiment of the invention. A chip breaker 25a rests sidewardly against side support surfaces 24d, 24d. On its top side the chip breaker is provided with lugs 33 and 35, which rest against surfaces in recesses 34 and 36 in a clamping jaw 26a. FIGURE 15 shows the lug and recess, which are closer to the insert site, and FIGURE 16 those situated further from the insert site. The contact surfaces are inclined, and under the influence of the clamping force they force the chip breaker into contact with the side supporting surfaces 24d, 24d. In this embodiment the clamping jaw 26a can rest in the tool holder on two conical studs 37 and 38 of the same type as the stud 17 in FIGURE 5, but also cylindrical studs of the same kind as the stud 29 in FIGURES 8 and 9 can be used. In case cylindrical studs are used, they will be pressed by the clamping force into contact with the parts of the corresponding bores remote from the chip breaker. If the studs 37 and 38 are conical or possibly edge shaped, so that the jaw 26a is fixed sidewardly, the side supports 24d, 24d can be situated on the jaw 26a instead of on the tool holder shank. In these figures the tool holder is marked 1g.

Still another possibility of achieving a sidewardly directed force against a clamping jaw, which is tightened by a clamping screw, is to arrange a spring under the jaw concentrically with the screw, whereby the jaw is pressed against the head of the screw and is turned by the friction force, when the screw is turned.

FIGURES 17 and 18 show the invention applied to an insert 2e of a different type than the one shown in FIGURES 4 and 5. The clamping means are in the main similar. When the insert has a parallelogram shape it may often be difficult to use a separate chip breaker, and therefore the insert itself can be provided with a chip breaking upper surface. Along the middle of the insert is a ridge 40 between inclined top surfaces 41 and 42 on both sides of the ridge. The insert is symmetrical so that the surfaces 41 and 42 may change places and the other acute angle corner be used as the cutting corner. Inserts of this type are often used in copy turning, a work which requires high accuracy, and for which the invention consequently is useful. The inclination of the top surfaces aids in giving the good sideward fastening which is the principal object of the invention. In these figures the parts which are identical with the parts shown in FIGS. 4 and 5 are marked by the same reference numerals.

Of course there are many possibilities of variation of the desired guiding of the clamping jaw, and the different details of the shown embodiments can be varied and combined with each other in different ways obvious to a person skilled in the art. The specification shows only examples of the invention within the scope of the appended claims.

I claim:

1. A tool holder comprising a holder shank, a cutting insert and a clamping jaw for clamping said insert against a bottom support surface in an insert site in said shank, an abutment surface positioned on said shank adjacent said insert site substantially perpendicular to said bottom surface, a pivot bearing between said holder shank and said clamping jaw remote from said insert site, a pin slidably mounted in a bore in the holder shank, a spring positioned to press said pin upwardly towards said clamping jaw, said pin having an inclined surface and an inclined surface on said clamping jaw positioned to be engaged by said inclined surface on said pin whereby to move said clamping jaw to engage said abutment surface.

2. A tool holder comprising a holder shank, a cutting insert and clamping means comprising a clamping contact member in contact with the top surface of the insert for clamping said insert against a bottom support surface in an insert site in said shank, stop means comprising an abutment surface adjacent the insert site and substantially perpendicular to said bottom support surface positioned to prevent sidewise movement of said clamping contact member with respect to said holder shank and means for urging said clamping contact member into engagement with said abutment surface, said last named means comprising a pin slidably mounted in a bore in the holder shank, a spring positioned to urge said pin upwardly towards said clamping contact member, said pin having an inclined surface and an inclined surface on said clamping contact member poistioned to be engaged by said inclined surface on said pin whereby said clamping contact member is held in engagement with said abutment surface.

References Cited by the Examiner

UNITED STATES PATENTS

| | | | |
|---|---|---|---|
| 1,776,335 | 9/30 | Ranzieres | 29—96 |
| 2,848,789 | 8/58 | Friedline | 29—96 |
| 2,860,402 | 11/58 | Proksa | 29—96 |
| 2,911,707 | 11/59 | Almen | 29—96 |
| 2,912,744 | 11/59 | Proksa | 29—96 |
| 2,949,662 | 8/60 | Cook | 29—96 |
| 3,052,952 | 9/62 | Bader | 29—96 |
| 3,084,416 | 4/63 | Broughton | 29—96 |
| 3,101,020 | 8/63 | Ditto | 29—96 X |

FOREIGN PATENTS

| | | |
|---|---|---|
| 968,404 | 4/50 | France. |
| 841,546 | 7/60 | Great Britain. |
| 341,697 | 11/59 | Switzerland. |

WILLIAM W. DYER, Jr., *Primary Examiner.*